May 10, 1960     A. L. HIGHBERG ET AL     2,935,842
NOISE SUPPRESSOR
Filed Oct. 1, 1957     3 Sheets-Sheet 1
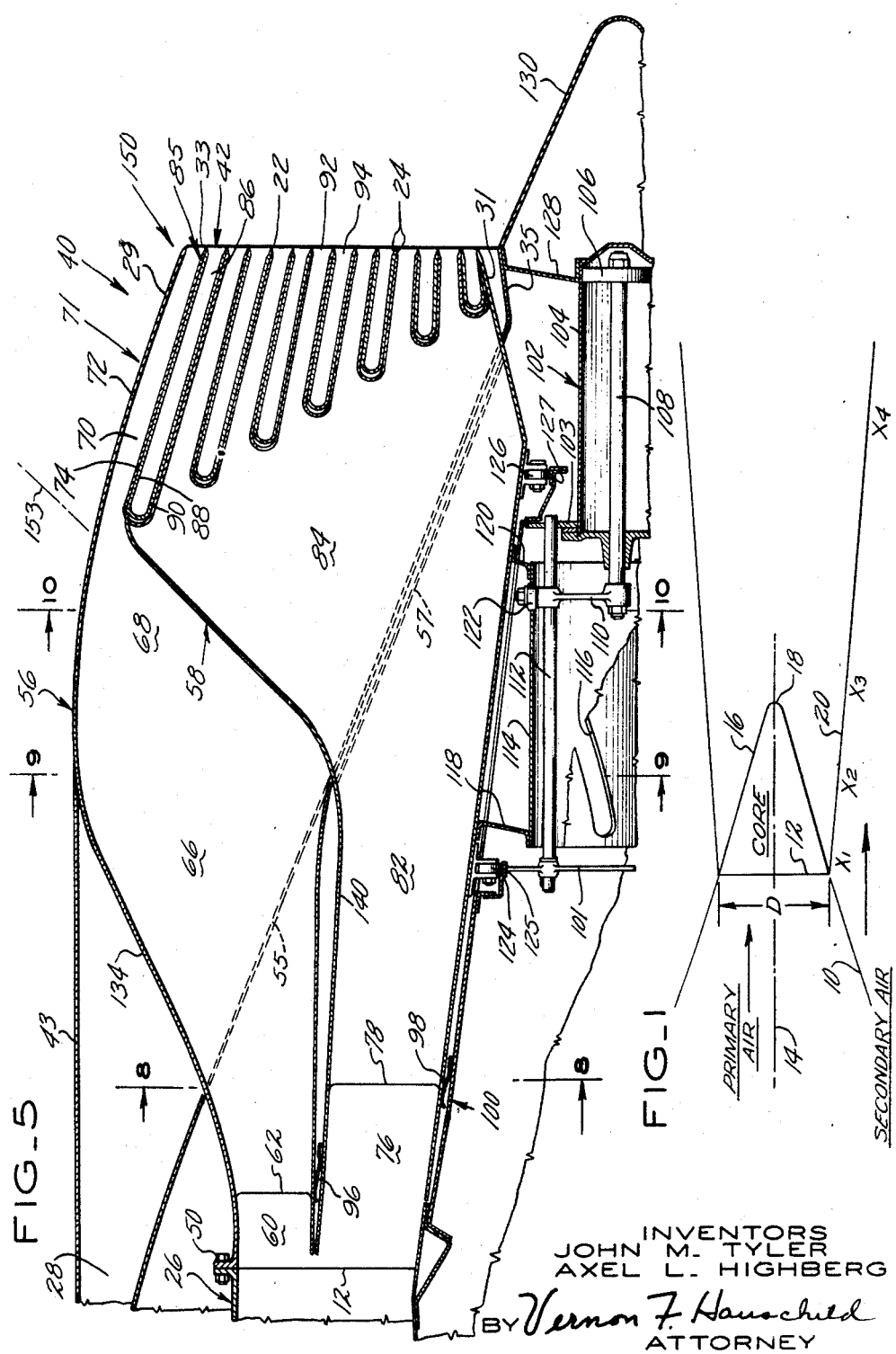
INVENTORS
JOHN M. TYLER
AXEL L. HIGHBERG
BY Vernon F. Hauschild
ATTORNEY May 10, 1960     A. L. HIGHBERG ET AL     2,935,842
NOISE SUPPRESSOR
Filed Oct. 1, 1957     3 Sheets-Sheet 2
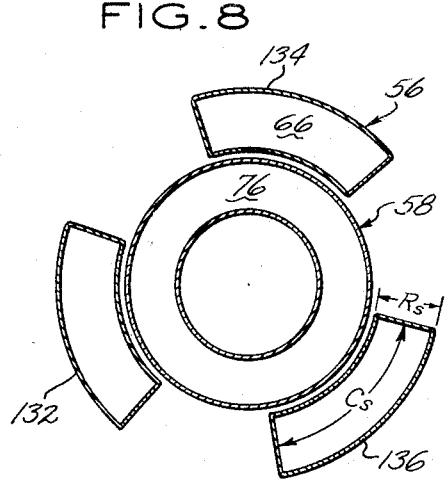
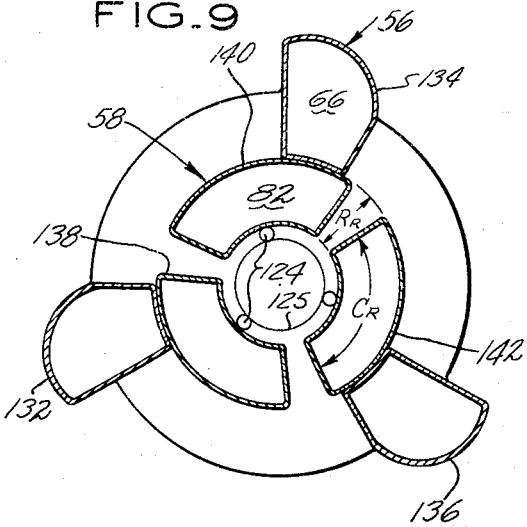
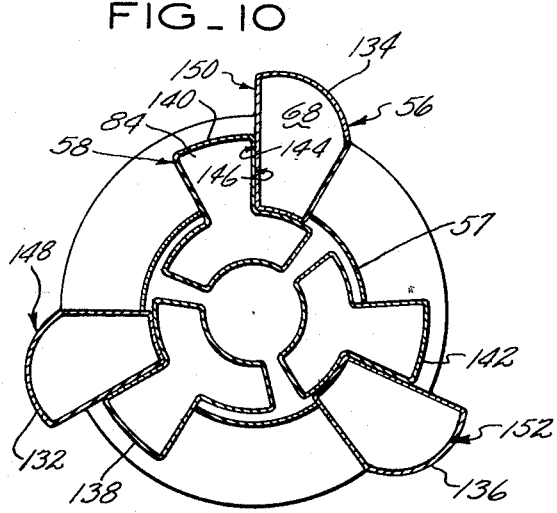
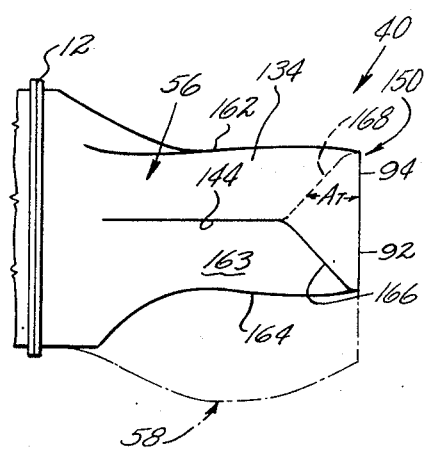
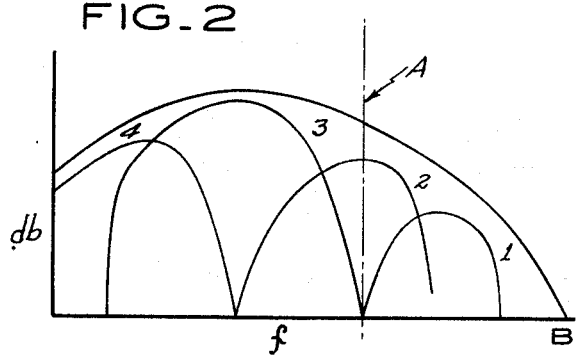
INVENTORS
JOHN M. TYLER
AXEL L. HIGHBERG
BY Vernon F. Hauschild
ATTORNEY

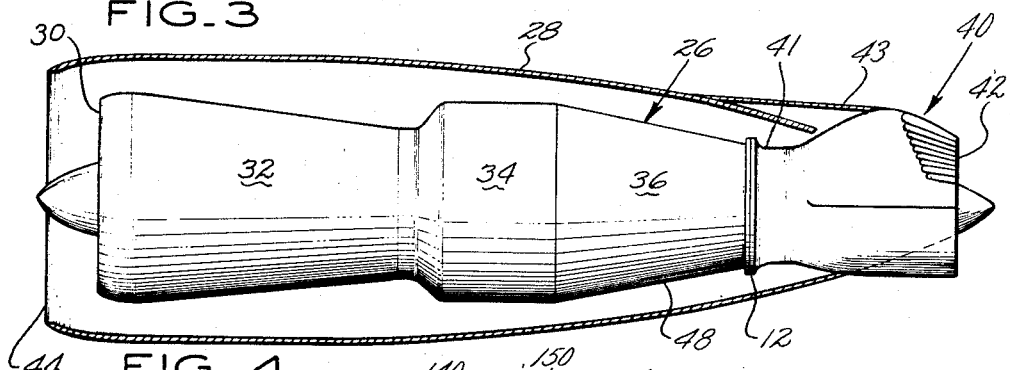
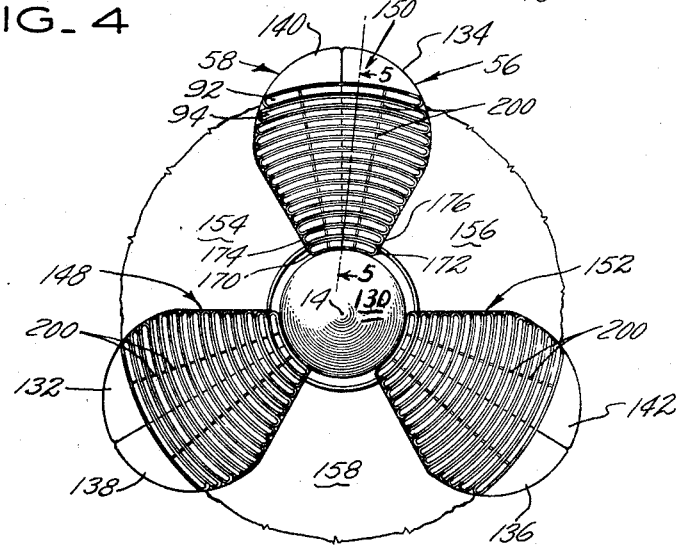
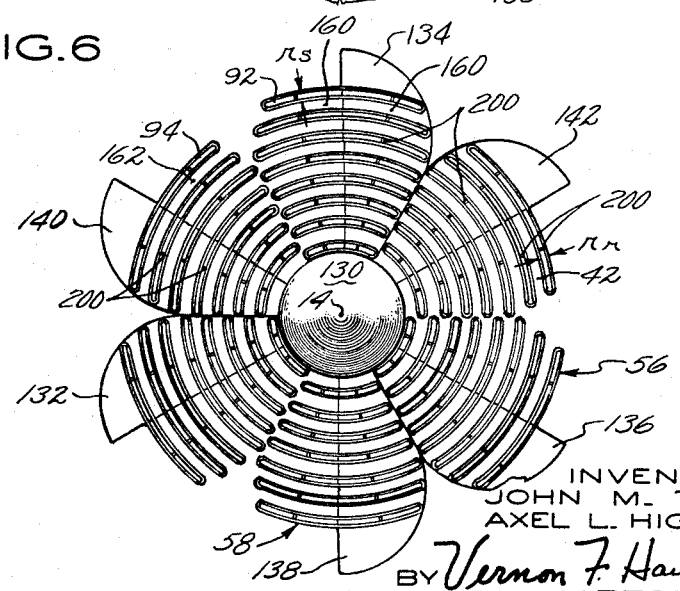

# United States Patent Office 2,935,842
Patented May 10, 1960

2,935,842

NOISE SUPPRESSOR

Axel L. Highberg, West Hartford, and John M. Tyler, South Coventry, Conn., assignors to United Aircraft Corporation, East Hartford, Conn., a corporation of Delaware Application October 1, 1957, Serial No. 687,408

14 Claims. (Cl. 60—35.6)

This invention relates to noise suppression and more particularly to the suppression of the noise associated with the jet discharge or blast from a turbojet engine of the modern aircraft type.

It is an object of this invention to provide a noise suppressor comprising a stationary unit and a rotary unit, each of which comprises three equally spaced nests of circumferentially and tangentially extending slots through which the exhaust gas will be discharged. Said units being so constructed that the rotary unit may be caused to intermesh with the stationary unit in the nonsilencing position to form a plurality of equally spaced duct lobes with the lobes culminating in a plurality of snugly radially aligned circumferential slots in three leaf clover form and the rotary unit may also be caused to assume a noise suppression or silencing position in which its slots form substantial circumferential continuations of the stationary unit slots thereby effecting an exhaust outlet of substantial circular form.

It is a further object of this invention to teach a jet noise suppressor which needs no flaps, seals, and nacelle-to-engine fairing ductwork but which comprises a one-piece stationary unit rigidly attached to the engine in combination with a one-piece rotary unit, said units being coaxial.

It is a further object of this invention to teach a jet noise suppressor in which both the aforementioned stationary and rotary units commence as annular ducts which, between them, receive all engine exhaust gases and which smoothly fair into three separate ducts and then through a transition section into the circumferential slot forming ductwork, maintaining constant gas flow area throughout their lengths until, at their after ends, they form convergent exhaust nozzles. Further, the duct transition section between the three separate ducts and the slot forming ductwork in the stationary and rotary units project in opposite circumferential directions so that the slot forming ductwork may intermesh to form circumferentially equally spaced, lobe-shaped clusters in the cruise or nonsilencing position and such that substantial paths are provided for secondary air flow between the slots of both the stationary and rotary units when the noise suppressor is in the aforementioned silencing position.

It is a further object of this invention to teach a jet noise suppressor in which the aforementioned stationary and rotary units may be positioned to form three equal area, circumferentially equally spaced lobes with equal area voids therebetween, each lobe forming an over-all convergent exhaust nozzle, effecting low aerodynamic drag characteristics at high subsonic flight speeds resulting from a standing shock wave exterior of each lobe. Further, a convergent-divergent exhaust nozzle is created by the gases exhausting through each circumferentially extending slot, since each slot is located at the downstream end of a convergent duct, thereby creating thrust aiding positive pressures on the slot forming ductwork rear surfaces as the exhaust gases which pass through each slot diverge downstream thereof.

It is a further object of this invention to teach a jet noise suppressor which is so constructed as to cause no negative pressures.

It is still a further object of this invention to utilize axially short gas passage forming ductwork to maintain aerodynamic skin losses at a minimum.

It is still a further object of this invention to teach a jet noise suppressor in which the slot forming ductwork rear surfaces are thin, preferably presenting 10% to 15% of the slot area, thereby preventing the creation of negative pressures thereon at the exhaust pressure ratios to be used by commercial jet engines under cruise conditions.

It is still a further object of this invention to teach a noise suppressor in which the number of exhaust discharge slots is independent of the number of parts involved.

Other objects and advantages will be apparent from the specification and claims, and from the accompanying drawings which illustrate an embodiment of the invention.

In the drawings:

Fig. 1 is a diagrammatic representation of the jet exhaust wake from a modern aircraft turbojet engine.

Fig. 2 is a graphic representation of the noise created at stations along the wake illustrated in Fig. 1 depicting the noise spectrum at each station in terms of frequency and decibels.

Fig. 3 is an external showing of a modern turbojet aircraft engine located within an aircraft nacelle and utilizing our exhaust silencer.

Fig. 4 is a rear view showing of our noise suppressor in the clustered, retracted, cruise or non-silencing position.

Fig. 5 is a showing through line 5—5 of Fig. 4.

Fig. 6 is a rear showing of the noise suppressor in its operative, extended, take-off or silencing position.

Fig. 7 is a top view of one of the lobes of our noise suppressor showing the overlapping relationship between the stationary and rotary slot forming ducting in the clustered position, as shown in solid lines, and showing the separation between the units through which secondary air may flow to be discharged around the slots when the rotary unit duct has rotated to its silencing position, as shown in phantom.

Figs. 8, 9, and 10 are showings taken along line 8—8, 9—9, and 10—10, respectively, of Fig. 6 to illustrate the constant area gas passage forming ductwork of both the stationary and rotary units located upstream of the convergent exhaust nozzle in which each duct or lobe culminates.

Referring to Fig. 1, we see an illustration of the jet wake or exhaust of the type which emanates from a modern turbojet aircraft engine. Normally, all of the exhaust gases are discharged through a single, large outlet. Reference numeral 10 illustrates the discharge duct which culminates in large circular exhaust outlet 12. The exhaust gases called primary air, are directed axially therethrough and mix with the surrounding air, called secondary air. Since this mixing occurs first nearest the wake periphery, the primary air loses its axial component more rapidly as its distance from axis 14 increases so that the primary air axial flow pattern is in the form of conically-shaped core 16 in which the axial component of the most centrally located exhaust gases is dissipated at apex 18. As previously stated, the air which flows through exhaust outlet 12 has passed through the jet engine and is defined as primary air, while the air which flows external of the engine is defined as secondary air. When the airplane is in flight the secondary air velocity relation to the engine is the airplane velocity, whereas the velocity imparted to the primary air is caused by the work of the engine compressor, burner, and turbine thereon so that the primary air velocity is considerably greater than secondary air velocity, thereby setting up a substantial shear effect along the boundary 20 between the primary and secondary air. This shear effect causes a turbulence creating rotary or whirling motion to be established along boundary 20 and globules of secondary air are drawn into and pocketed within the primary air of the engine wake. Pressure fluctuations are produced by this turbulence within the primary air of the wake, the engulfed globule or pocket of secondary air or turbulent eddy is alternately compressed and permitted to expand as it moves along in the wake. Thus the wake boundary 20 is a fluctuating or undulating boundary and it radiates acoustic energy in the form of sound waves. As the turbulence which occurs along boundary 20 near exhaust outlet 12 is finer grain or smaller scale turbulence than occurs downstream thereof, its acoustic energy is of a higher frequency nature than that so created farther downstream in the wake. If we were to place microphones at stations $X_1$, $X_2$, $X_3$, and $X_4$, we would find, as shown in the Fig. 2 graph, that the sound spectrum created by each would be as shown in lobes 1, 2, 3, and 4. Lobe 4 is shown to be of low frequency and of substantial decibel intensity whereas lobe 3 is shown to be of somewhat higher frequency and a greater decibel intensity. Lobe 2 is of a still higher frequency but of a reduced decibel intensity whereas lobe 1 is a very high frequency and the lowest decibel intensity. Line A of Fig. 2 represents a limit above which sound energy is absorbed rapidly as it is transmitted through the air. Accordingly, it is the objective of our noise suppressor to cause the sound waves created by the jet wake to lie in a high frequency spectrum only.

Since it can be shown that maximum noise intensity occurs some five or so exhaust outlet diameters downstream thereof, assuming a 2.5 take-off pressure ratio, we can reduce wake noise by reducing diameter D of exhaust outlet 12. As the diameter or corresponding dimension of our exhaust outlet decreases, the secondary air is able to mix with the primary air more quickly, due to the decreased thickness of the wake.

Optimum noise suppressor configurations must be designed with these principles in mind:

(1) The thickness of the jet wake portions must be such that the secondary air may mix therewith within a short period of space and time for the reasons given supra.

(2) The configuration must be such that negative pressures are not created on the suppressor rear surfaces for these negative pressures impose a force opposite to the direction of engine travel.

(3) A convergent-divergent effect is desirable since a positive and engine motion assisting force is imposed thereby on the suppressor rear surfaces.

With respect to the negative pressure effect, it is essential that the exhaust gas passage defining ductwork must not present a substantial amount of blunt rear surface. For instance, if, in an effort to effect a plurality of small exhaust wakes we were to place a circular plate over exhaust outlet 12 and drill a plurality of holes therein, we would find that a negative pressure would be set up on the downstream face of the plate between holes due to the sucking effect established thereon by the rapid discharge of exhaust gases through the holes. If we so space out holes in the plate such that the remaining metal constitutes but 10% to 15% of the total plate area, and this area is covered with pyramid shaped projections, under the conditions given supra, and if the holes are drilled such that a convergent nozzle is formed by each hole in the plate then the desirable convergent-divergent effect would be achieved, although the secondary air mixing problem would not.

In further considering the positive pressure established by the convergent-divergent nozzle, let us consider the typical De Lavelle nozzle formed by convergent ductwork with divergent ductwork downstream thereof; in such an installation a thrust augmenting positive pressure is caused to react upon the inner, rear surface of the divergent section by the expansion of the exhaust gases passing through the divergent section. In the same fashion, a thrust augmenting positive pressure is established on a tailcone whose apex extends beyond the normal exhaust outlet for the proportionate areas of exhaust gas passage at the exhaust outlet and at the tailcone apex creates the convergent-divergent expansion effect. In this connection, it will be noted with respect to Fig. 5 that the shape of the over-all exhaust nozzle created by our slot plurality is convergent, note convergent walls 29, 31, 33, and 35, and the tendency of the gas to expand downstream of the exhaust outlet 42 creates the divergent effect and the desired thrust augmenting positive pressures along each slot defining duct rear surface or after end wall thickness 22 as illustrated at 24.

Referring to Fig. 3, we see a modern turbojet aircraft engine 26 shown located within aircraft nacelle 28. Aircraft engine 26 comprises air inlet 30, compressor section 32, combustion chamber section 34, and turbine section 36. Primary air enters engine 26 through intake 30 and is compressed as it passes through compressor section 32. Heat is added to the primary air as it passes through combustion section 34 and power is extracted from the engine gases as they pass through turbine section 36. After passing through turbine section 36 the exhaust gases would normally be discharged to atmosphere through circular outlet 12. In the installation shown, however, our noise suppressor 40, which is basically a gas passage forming conduit system, is attached to engine 26 at its circular inlet 41 at normal exhaust outlet 12 so that now all exhaust gases must pass through exhaust outlet 42 of noise suppressor 40. When noise suppressor 40 is in its retracted or non-silencing position, the secondary or free stream air passes through the voids existing between the slot clusters. When noise suppressor 40 is in its silencing position, the secondary air passes through the openings which exist between the slot forming ducts thereby providing secondary air on all sides of each primary exhaust gas discharge slot for mixing and silencing purposes. Two part U-shaped hoods 43 extend from nacelle 28 and serve to smoothly blend nacelle 28 to the lobes of noise suppressor 40 and one half part of each U-shaped hood 43 is fixed to the stationary portion of each lobe and one half part of each U-shaped hood 43 is fixed to the rotating portion of each lobe. The flow of secondary air will be more completely described hereinafter.

Referring to Fig. 5, we see our noise suppressor 40 in cross-section and in its clustered, retracted, non-silencing position. Noise suppressor 40 is attached to engine 26 at normal circular exhaust outlet 12 by connecting means 50 which may be the familiar abutting circumferential flanges with nut and bolt units projecting therethrough. Engine nacelle 28 is shown to have secondary air guiding extensions 55 and 57 extending between the lobes of the stationary unit or conduit system 56 and the rotary unit or conduit system 58, respectively. Both stationary unit 56 and rotary unit 58 comprise gas passage forming ducts which are of constant area throughout most of the length of each unit. Stationary unit 56 commences with annular portion 60 at its upstream or forward end and, disperses at wall 62 into three equal area and equally spaced separate ducts such as 134 which smoothly diverge outwardly and become narrower circumferentially in area 66 and then continues to increase in height and diminish in width to maintain relatively constant area through section 68 and finally form an overall convergent exhaust nozzle 71 and also forms a plurality of discharge slot defining passages such as 70 which converge and exists between duct-to-slot defining transition walls 72 and 74.

Rotary unit 58 also commences at its upstream or forward end with an annular section 76 and divides at wall 78 into three equal area and equally spaced separate ducts such as 140 along area 82. Each of the rotary ducts such as 140 of rotary unit 58 increases in height or radial dimension and reduces in width or circumferential dimension in area 84 keeping a relatively constant cross-sectional area and finally forms an overall convergent exhaust nozzle 85 and also forms a plurality of slot defining exhaust gas discharge ducts such as 86 which are convergent and located between duct-to-slot defining transition section walls 88 and 90.

Figs. 8, 9, and 10 are taken along stations 8—8, 9—9, and 10—10 of Fig. 5 to illustrate the shape or form of stationary unit 56 and rotary unit 58 such that constant area is maintained throughout the length of each unit upstream of convergent exhaust nozzles 71 and 85 and such that each unit commences as an annulus, then divides into three equal area and equally spaced ducts and culminates in a plurality of circumferentially extending and radially spaced discharge slots defining ducts, such as slot 92 of stationary unit 56 and the slot 94 of rotary unit 58, to form lobe shaped exhaust outlet 42. Because of the annular inlet shape of stationary unit 56 and rotary unit 58 a single annular seal 96 may be used to seal between the units and a second annular seal 98 may be used to seal between rotary unit 58 and engine support unit 100 which is located inboard thereof. Further, because stationary unit 56 and rotary unit 58 are each one-piece units, these are the only seals necessary since there are no overlapping flaps and associated parts which are normally encountered in exhaust outlet arrangements. Since unit 56 is stationary it is solidly affixed with great rigidity to engine 26 through connecting means 50, and because rotary unit 58 is located radially between stationary unit 56 and engine support unit 100, substantial support is provided for rotary unit 58. The fact that rotary unit 58 is a one-piece unit comprising three separate lobes of discharge slots permits actuation of unit 58 from its clustered to its silencing position or vice versa with a minimum amount of part rotation.

Rotation of rotary unit 58 is accomplished by actuating means 102 (Fig. 5) which comprises in part pressurizable cylinder 104 with movable piston 106 located therein. Piston 106 carries rod 108 and arm 110 as it makes within cylinder 104. Arm 110 engages stationary rod 112, which is supported in stationary position by support unit 100 through supports 101 and 103. Cylinder drum 114 which has cam slot 116 therein is attached to rotary unit 58 through flanges 118 and 120 such that, as piston 106 is caused to move by the pressure differential of hydraulic fluid within cylinder 104, arm 110, which carries bearing or cam follower 122 will be caused to translate therewith, thereby rotating drum 114 and rotary unit 58. Rollers 124 and 126 project inwardly from rotary unit 58 and contact rings 125 and 127 of support unit 100 in rotary engagement so as to assist in the rotation of rotary unit 58. Web 128 projects inwardly from stationary unit 56 to support the after end of cylinder 104. Tailcone 130 projects rearwardly from stationary unit 56, and receives the thrust augmenting positive pressures along with the rear surfaces 22 of noise suppressor 40, due to the convergent-divergent exhaust nozzle effect described supra.

All engine exhaust gas from engine 26 must pass through either stationary unit 56 or rotary unit 58.

Referring to Figs. 5, 7, 8, 9, and 10 it will be noted that primary air enters stationary unit 56 at annular inlet sections 60 and then breaks up into three equal area, circumferentially equally spaced ducts 132, 134, and 136, (Fig. 8), which ducts decrease in circumferential dimension $C_s$ (see Fig. 8) while increasing in radial dimension $R_s$ (see Fig. 8) in a downstream direction as shown in Figs. 8, 9, and 10, and the primary air then enters one of the plurality of slot forming ducts such as 70 (Fig. 5) to be discharged through a circumferentially extending or tangential exhaust slot such as 92. The portion of the engine exhaust gas which does not enter stationary unit 56 enters annular inlet 76 of the rotary unit 58 and then separates into one of three equal area, circumferentially equally spaced ducts 138, 140, and 142, which ducts decrease in circumferenial dimension $C_r$ (see Fig. 9) and increase in radial dimension $R_r$ (see Fig. 9) in a downstream direction as illustrated in Figs. 8, 9, and 10 and the primary air in rotary unit 58 eventually passes into one of a plurality of slot forming ducts such as 86 (Fig. 5), to be discharged through a circumferential or tangential slot such as 94.

With reference to Fig. 10 it will be noted that the adjacent, axially extending surfaces 144 and 146 of stationary unit 56 and rotary unit 58, respectively abut to form three equal area, circumferentially equally spaced lobes 148, 150, and 152, which lobes are symmetrically located about exhaust outlet 42. As shown in Fig. 5, a standing shock wave 153 is formed along each lobe 148, 150, and 152 and is of aerodynamic assistance in flight.

Referring to Figs. 4 and 6, we see rear discharge slot pattern illustrating showings of noise suppressor 40 first in its retracted, clustered, and non-silencing position in Fig. 4 and in its operative, extended, silencing position in Fig. 6. Referring to Fig. 4, it will be noted that rotary unit 58 has been rotated such that its circumferential slots such as 94 intermesh with or overlap the circumferential slots such as 92 of stationary unit 56 so as to form three equal area, circumferentially equally spaced clusters or lobes 148, 150, and 152 which cooperate to give the appearance of a three leaf clover and, with equal area, circumferentially equally spaced voids 154, 156, and 158 therebetween, such that all exhaust gases from engine 26 must pass through one of the slots such as 92 and 94 in one of the lobes or clusters 148, 150, or 152. It will be noted that in its retracted, clustered, non-silencing position the circumferential slots 92 and 94 are closely aligned radially such that no secondary air will pass between the slots but must pass through the voids 154, 156, and 158 between the slot clusters 148, 150, and 152. As best shown in Fig. 4, the successive slots of both units first increase then decrease in circumferential dimension or angular span uniformly as their radial distance from axis or centerline 14 increases so that clusters 148, 150, and 152 are lobe-shaped.

When noise suppression operation is desired, actuation mechanism 102 is utilized to cause rotary unit 58 to rotate from its clustered position in a counterclockwise direction to fill the voids 154, 156, and 158 of Fig. 4 so as to form circular form exhaust gas outlet 42 as shown in Fig. 6 in which the circumferential slots such as 94 of rotary unit 58 form a substantial circumferential continuation of circumferential slots 92 of stationary unit 56 so that a continuous, symmetrical, circumferentially extending slot pattern is formed by slots 92 and 94 of stationary unit 56 and rotary unit 58. It will be noted that there are radial spaces or voids 160 and 162 between adjacent slots 92 and 94 respectively, through which secondary air passing over the engine nacelle may pass to mix with the primary air being discharged through circumferential slots 92 and 94 to perform the noise suppression function desired and described supra. The radial dimension $r_s$ of slots 92 and $r_r$ of slots 94 are small so that in the manner previously described the secondary air may co-mingle and mix with the primary air rapidly to convert the high frequency turbulent energy of the primary wake to high frequency sound waves, which will be dissipated almost immediately.

Now referring to Fig. 7, we see that the circumferential slots 92 and 94 of stationary unit 56 and rotary unit 58, respectively, are able to intermesh so as to form the lobe-shaped clusters 148, 150, and 152 since representative ducts 134 and 140 of the respective units are shaped so as to abut and be juxtapositioned along their adjacent surfaces 144 and 146 and such that their opposite surfaces 162 and 164 are substantially parallel while their respective duct-to-slot transition sections 166 and 168, which form slot forming passages such as 70 and 86 of Fig. 5 project in opposite circumferential directions and are so shaped that the circumferential edges 170 and 172 of stationary slot 92 are substantially radially aligned or nearly so with the circumferential edges 174 and 176 of rotatable slot 94 (see Fig. 4).

The shape and construction of transition sections 166 and 168 perform the additional function, when in the silencing position shown in phantom in Fig. 7, of placing interslot voids such as 160 and 162 into direct communication with the secondary air passing over the nacelle such that liberal quantities of secondary air may flow through such voids 160 and 162 with a minimum of restriction or interference. It will be noted in Fig. 7 that transition sections 166 and 168 are of minimum axial dimension $A_t$ thereby reducing skin friction to a minimum.

As best shown in Figs. 4 and 6, any number of support members 200 may be used to retain slots 92 and 94 in proper shape against the gas pressure attempting to separate the walls thereof.

It is to be understood that the invention is not limited to the specific embodiment herein illustrated and described but may be used in other ways without departure from its spirit as defined by the following claims. For instance, there may be any number of stationary and/or rotary units used to form the noise suppressor.

We claim:

1. A jet noise suppressor having an axis and an inlet and an outlet through which fluid may be passed, said suppressor comprising a stationary unit and a rotary unit with each unit comprising an inlet passageway in flow communication with said suppressor inlet and which smoothly blends into at least one duct which leads to a plurality of circumferentially extending, radially spaced discharge slots which form said outlet, said slots being of such circumferential dimension and of such radial dimension and spacing that said rotary unit may be rotated about said axis to a non-noise suppression position in which the slots of said units cooperate to form at least one slot cluster and further such that said rotary unit may be rotated about said axis to a noise suppression position in which its slots are positioned to form a circumferential continuation of said stationary unit slots.

2. A jet noise suppressor having an axis and an inlet and an outlet through which fluid may be passed, said suppressor comprising a one piece stationary unit and a one piece rotary unit coaxial with said stationary unit and with each unit having a passageway smoothly blending from said inlet into a plurality of circumferentially extending, radially spaced discharge passages which form said outlet, said passages being of such circumferential and radial dimension and spacing that said rotary unit may be rotated about said axis to a non-noise suppression position in which the discharge passages of said units interfit to form a discharge passage cluster and further such that said rotary unit may be rotated about said axis to a noise suppression position in which its discharge passages are positioned circumferentially from said stationary unit discharge passages.

3. A jet noise suppressor having an axis and an inlet and an outlet through which fluid may be passed, said suppressor comprising a stationary unit and a rotary unit with each unit comprising a continuous inlet passageway in flow communication with said noise suppressor inlet and which smoothly blends into a plurality of axially extending, circumferentially spaced ducts each of which leads to a plurality of circumferentially extending, radially spaced discharge slots forming passages which cooperate to form said outlet, said passages extending from each of said ducts and defining a convergent fluid discharge nozzle, said passages being of such circumferential dimension and of such radial dimension and spacing that said rotary unit may be rotated about said axis to a non-noise suppression position in which the said passage of said units overlap to form a plurality of passage clusters and further that said rotary unit may be rotated about said axis to a noise suppression position in which its said passages are positioned circumferentially between said stationary unit passages.

4. A jet noise suppressor having an axis and an inlet and an outlet through which fluid may be passed, said suppressor comprising a stationary unit and a rotary unit with each unit comprising a continuous inlet passageway in flow communication with said noise suppressor inlet and which smoothly blends into a plurality of circumferentially spaced pipes which lead to a plurality of circumferentially extending, radially spaced fluid ducts defining slots at their after ends which slots form said outlet, said ducts being convergent and of such circumferential dimension and of such radial dimension and spacing that said rotary unit may be rotated about said axis to a non-noise suppression position in which the slots and ducts of said units overlap to form a plurality of slot clusters in which said slots are snugly aligned radially and further such that said rotary unit may be rotated about said axis to a noise suppression position in which its slots are positioned circumferentially between said stationary unit slots, said ducts being of such wall thickness at their said after ends that when in said non-noise suppression position the combined wall thickness of adjacent overlapping ducts separates said slots a sufficient radial distance that a convergent-divergent exhaust nozzle is formed by the discharge of fluid through each of said slots thereby creating a positive pressure against said duct after end wall thickness.

5. A jet noise suppressor having an axis and an inlet and an outlet through which fluid may be passed, said suppressor comprising a stationary unit and a rotary unit with each unit comprising a continuous inlet passageway in flow communication with said noise suppressor inlet and which smoothly blends into a plurality of circumferentially spaced pipes which leads to a plurality of circumferentially extending, radially spaced fluid ducts defining slots at their after ends which slots form said outlet, said ducts being convergent and of such circumferential dimension and of such radial dimension and spacing that said rotary unit may be rotated about said axis to a non-noise suppression position in which the slots and ducts of said units overlap to form a plurality of slot clusters in which said slots are snugly aligned radially and further such that said rotary unit may be rotated about said axis to a noise suppression position in which its slots are positioned circumferentially between said stationary unit slots, said ducts being of such wall thickness at their said after ends that when in said non-noise suppression position the combined wall thickness of adjacent overlapping ducts separate said slots a sufficient radial distance that a convergent-divergent exhaust nozzle is formed by the discharge of fluid through each of said slots thereby creating a positive pressure against said duct after end wall thickness, said ducts being of such wall thickness at their said after ends that the total area of the duct after end wall thickness is less than 15% of the total area of said slots.

6. A jet noise suppressor having a conduit system defining an inlet and an outlet of circular form through which fluid may be passed, said conduit system comprising a stationary unit and a rotary unit with each unit comprising an annular inlet passageway in flow communication with said noise suppressor inlet and which smoothly blends into a plurality of substantially circumferentially equally spaced ducts each of which leads to a plurality of circumferentially extending, radially spaced discharge slots which form said outlet, said slots being of such circumferential dimension and of such radial dimension and spacing that said rotary unit may be rotated to a non-noise suppression position in which the slots of said units intermesh to form a plurality of substantially circumferentially equally spaced slot clusters with equal area voids between said clusters and further such that said rotary unit may be rotated to a noise suppression position in which its slots form a substantially circumferential continuation of said stationary unit slots to present a uniform, continuous, circumferentially extending slot pattern.

7. A jet noise suppressor having an inlet and an outlet of circular form and comprising a stationary conduit system and a rotary conduit system with each system comprising an annular inlet passageway in flow communication with said noise suppressor inlet and which smoothly blends into a plurality of substantially circumferentially equally spaced ducts which lead to a convergent exhaust nozzle including a plurality of circumferentially extending, radially spaced outlet slots, each of said systems defining a constant total area conduit throughout its length until it reaches said exhaust nozzle, said slots being of such circumferential dimension and of such radial dimension and spacing that said rotary system may be rotated to a non-noise suppression position in which the slots of said systems intermesh to form a plurality of substantially circumferentially equally spaced slot clusters with equal area voids between said clusters and further such that said rotary system may be rotated to a noise suppression position in which its slots form a substantially circumferential continuation of said stationary system slots to present a uniform, circular slot pattern.

8. A jet noise suppressor having an axis, means to pass primary fluid through said suppressor and secondary fluid around said suppressor, said suppressor comprising a stationary conduit system and a rotary conduit system with each system comprising an annular inlet passageway in flow communication with said noise suppressor inlet and which smoothly blends into three substantially circumferentially equally spaced ducts which lead to a plurality of circumferentially extending, radially spaced outlet slots, said slots being of such circumferential dimension and of such radial dimension and spacing that said rotary system may be rotated about said axis to a non-noise suppression position in which the slots of said systems intermesh to form a plurality of substantially circumferentially equally spaced slot clusters with equal area voids between said clusters and further such that said rotary system may be rotated about said axis to a noise suppression position in which its slots form a substantially circumferential continuation of said stationary system slots to present a uniform, continuous, circumferentially extending slot pattern of circular form, such ducts of said rotary and stationary systems being so shaped that when in said noise suppression position, substantial radial clearance exists between slots through which secondary fluid may pass, and when in said non-noise suppression position, the circumferential ends of said slots in each of said clusters are aligned to define a lobe with said stationary system duct and said rotary system duct connected thereto, and cooperating with the remaining slots and ducts to form an exhaust outlet in the shape of three circumferentially equally spaced lobes.

9. A jet noise suppressor through which fluid may be passed and having an axis, an inlet and an outlet and comprising a stationary unit and a rotary unit with each unit comprising an annular inlet passageway in flow communication with said noise suppressor inlet and which smoothly blends into three substantially circumferentially equally spaced ducts which lead to a plurality of circumferentially extending, radially spaced discharge passageways forming a convergent exhaust nozzle section culminating in slots which form said outlet, a tailcone concentric within said outlet and projecting downstream therefrom, said slots being of such circumferential dimension and of such radial dimension and spacing that said rotary unit may be rotated about said axis to a non-noise suppression position in which the slots of said units intermesh to form three substantially circumferentially equally spaced slot clusters with equal area voids between said clusters and further such that said rotary unit may be rotated about said axis to a noise suppression position in which its slots form a substantially circumferential continuation of said stationary unit slots to present a uniform, continuous, circumferentially extending slot pattern of circular form, and such that a positive pressure is imposed upon said tailcone due to the convergent-divergent exhaust nozzle effect caused by discharging fluid through said slots located downstream of said convergent exhaust nozzle.

10. A jet noise suppressor having an axis, an inlet and an outlet, means to pass primary fluid through said suppressor and secondary fluid around said suppressor, said suppressor comprising a stationary conduit system and a rotary conduit system with each system comprising an annular inlet passageway in flow communication with said noise suppressor inlet and which smoothly blends into three substantially circumferentially equally spaced, equal area ducts which terminate in a convergent exhaust nozzle comprising a plurality of circumferentially extending, radially spaced passageways culminating in slots forming said outlet and with each of said systems defining constant total area primary fluid passages throughout its length until it reaches said convergent exhaust nozzles, said slots being of such circumferential dimension and of such radial dimension and spacing that said rotary system may be rotated about said axis to a non-noise suppression position in which the slots of said systems intermesh to form three substantially circumferentially equally spaced slot clusters with equal area secondary fluid passages between said clusters and further such that said rotary system may be rotated about said axis to a noise suppression position in which its slots form a substantially circumferential continuation of said stationary system slots to present a uniform, continuous, circumferentially extending slot pattern of circular form, said ducts of said rotary and stationary systems being so shaped that when in said noise suppression position, substantial radial clearance exists between slots through which secondary fluid may pass.

11. A turbo-jet engine having a compressor, combustion chamber and turbine coaxially aligned with and concentric within a housing through which primary operating air passes and around which secondary air passes, a jet noise suppressor coaxial with and connected to said housing and having an inlet and an outlet and comprising a stationary unit and a rotary unit with each unit comprising an inlet passageway in flow communication with said noise suppressor inlet and which receives said primary air and which smoothly blends into a plurality of substantially circumferentially equally spaced ducts which lead to a plurality of circumferentially extending, radially spaced discharge slots which form said outlet, each of said units changing in shape from annular shape at its inlet into three equal area ducts which progressively increase in radial dimension and progressively decrease in circumferential dimension throughout their length and then into a plurality of radially spaced, circumferentially extending individual portions which expand progressively circumferentially on one circumferential side only and culminate in said discharge slots such that said units define a constant total area primary air passage throughout their length upstream of said discharge slots and further such that said individual portions of said stationary and said rotary units expand circumferentially in opposite directions, said slots being of such circumferential dimension and of such radial dimension and spacing that said rotary unit may be rotated to a non-noise suppression position in which the slots of said units intermesh to form a plurality of substantially circumferentially equally spaced slot clusters with each stationary duct abutting a rotary duct and with equal area voids between said clusters and abutting ducts through which secondary air will flow, and further such that said rotary unit may be rotated to a noise suppression position in which its slots form a substantially circumferential continuation of said stationary unit slots to present a uniform, continuous, circumferentially extending slot pattern of circular form while said ducts are circumferentially spaced to permit the passage of secondary air therebetween and between said radially spaced slots.

12. A jet noise suppressor having an axis and conduits defining an inlet and an outlet through which fluid may be passed, said conduits comprising a stationary unit and a rotary unit with each unit comprising an inlet passageway in flow communication with said noise suppressor inlet and which smoothly blends into a plurality of substantially circumferentially equally spaced ducts which lead to a plurality of circumferentially extending, radially spaced discharge slots, each of said units changing in shape from annular shape at its inlet into three equal area ducts which progressively increase in radial dimension and progressively decrease in circumferential dimension throughout their length and then into a plurality of radially spaced, circumferentially extending individual transition sections which expand progressively circumferentially on one circumferential side only and culminate in said discharge slots such that each of said units define a constant total area fluid passage throughout its length and further such that said individual transition sections of said stationary and said rotary units expand circumferentially in opposite directions, said slots being of such circumferential dimension and of such radial dimension and spacing that said rotary unit may be rotated about said axis to a non-noise suppression position in which the slots of said units intermesh to form a plurality of substantially circumferentially equally spaced slot clusters with equal area voids between said clusters and further such that said rotary unit may be rotated about said axis to a noise suppression position in which its slots form a substantial circumferential continuation of said stationary unit slots to present a uniform, continuous, circumferentially extending slot pattern.

13. A jet noise suppressor having an inlet and an outlet, said suppressor comprising a one-piece stationary unit and a one-piece rotary unit, each of said units comprising ductwork having an inlet passageway in flow communication with said noise suppressor inlet and culminating at its outlet end in a plurality of circumferentially extending, radially spaced discharge slots, said rotary unit being rotatable to intermesh its slots with the slots of said stationary unit to form a plurality of circumferentially equally spaced, equal area, lobe-shaped slot clusters.

14. A jet noise suppressor having an inlet and an outlet, said suppressor comprising a one-piece stationary unit and a one-piece rotary unit, each of said units comprising ductwork having an inlet passageway in flow communication with said noise suppressor inlet and culminating at its outlet end in a plurality of circumferentially extending, radially spaced, discharge slots, said rotary unit being rotatable to intermesh its slots with the slots of said stationary unit to form three circumferentially equally spaced, equal area, lobe-shaped slot clusters and further being rotatable to a position where its slots form substantially circumferential continuations of stationary unit slots to present a uniform, continuous discharge slot pattern.

No references cited.